United States Patent [19]

Bounds, Jr.

[11] Patent Number: 5,107,794
[45] Date of Patent: Apr. 28, 1992

[54] EGG TRANSFER DEVICE

[76] Inventor: Edward G. Bounds, Jr., 1707 Timberlake Dr., Salisbury, Md. 21801

[21] Appl. No.: 756,560

[22] Filed: Sep. 9, 1991

[51] Int. Cl.$^5$ ............................................. A01K 41/06
[52] U.S. Cl. ..................................... 119/44; 119/45.3
[58] Field of Search ................ 119/43, 44, 45.1, 45.3

[56] References Cited

U.S. PATENT DOCUMENTS

| | | | |
|---|---|---|---|
| 1,646,334 | 10/1927 | Wollenhaupt | 119/45.1 |
| 1,773,896 | 8/1930 | Jackson | 119/44 |
| 2,267,473 | 12/1941 | Markey . | |
| 2,793,581 | 5/1957 | Cannon | 119/44 |
| 4,512,285 | 4/1985 | McGehee | 119/44 |
| 5,003,924 | 4/1991 | Dambre | 119/44 |

FOREIGN PATENT DOCUMENTS

| | | | |
|---|---|---|---|
| 1113606 | 9/1961 | Fed. Rep. of Germany . | |
| 408632 | 7/1974 | U.S.S.R. | 119/43 |
| 862086 | 3/1961 | United Kingdom | 119/43 |

Primary Examiner—Paul J. Hirsch
Attorney, Agent, or Firm—Harry Williams

[57] ABSTRACT

An egg transfer device having an active rotator assembly and a passive rotator assembly pivoted about a common axis above a support table. An automatic clamping device associated with the active rotator assembly is in an unlocked or open position to allow the active rotator to be loaded with a tray of setter egg flats. A hatcher receiver tray in which the eggs from the setter egg flats are to be transferred is disposed on top of the egg flats and, as well, in the passive rotator once it is rotated into an operative position. The two rotator assemblies are then rotated together as a unit about their common axis 180 degrees to their opposite position on the table support. At the same time the automatic clamping assembly is automatically biased into its locked position, thus firmly gripping the tray of setter egg flats securely into the active rotator assembly as it is being rotated, and stays in its locked position until the active rotator assembly is swung back separately to its original position on the table, at which time the clamping assembly is automatically unlocked.

10 Claims, 3 Drawing Sheets

EGG TRANSFER DEVICE

BACKGROUND OF THE INVENTION

This invention relates to mechanical devices for the transfer of eggs from one processing station to another processing station, specifically from a climate controlled setter chamber to a climate controlled hatcher chamber where the newborn chicks are hatched.

In the past it has been found that the transferring of eggs from one processing station to another has been greatly facilitated by turning the eggs over as a single group (several dozen) during the transfer, so that the eggs will be transferred from the one tray associated with the one processing station to another tray associated with the other processing station. In many cases this procedure had been conducted manually, that is, two workman would manipulate the two types of trays as a superimposed unit, revolving same, 180 degrees for example, so that the transfer of the eggs from the one tray to the other is completed, and then separating the trays after the transfer. During the course of such manual transfer, many eggs would be broken, as much as 5% of the number of eggs transferred for each transfer operation.

It is also known to use mechanical means for effecting such transfer operations, that is, to connect the two aforementioned trays by a mechanical housing and locking means and then rotating the unit about a common axis for the required 180 degrees to effect the transfer. Once the transfer is completed the two housings are separated by rotating one half of the housing back to its original position so that the respective superimposed trays, the tray containing the setter egg flats and the hatcher tray itself can be manually separated from one another. In such cases, however, the manual removal of the one type of tray from the other is a time consuming operation that often results in further egg breakage, owing to the manual interference at this stage in the mechanical transfer operation, with the result in many cases of the one tray being dropped on the other while the two trays are being separated. Not only is time wasted but a considerable amount of egg breakage is encountered, much more, for example, than might be encountered during the mechanical transfer of the eggs themselves.

There is a need, therefore, for an efficient mechanical egg transfer device which will afford an easy and quick transfer of a large number of eggs (several dozen) with minimal or no breakage in a minimum amount of time.

OBJECTS AND SUMMARY OF THE INVENTION

It is a primary purpose and principle object of the present invention to address the aforementioned needs and provide a mechanical egg transfer device which will simplify the transfer of eggs from a climate controlled egg setter chamber to a climate controlled egg hatcher chamber.

It is a primary feature of the present invention to transfer a large number of eggs in a single operation from a tray of setter egg flats to a hatcher tray in a quick and easy operation that will automatically separate the two trays one from the other, safely and quickly, once the eggs are transferred from the one tray to the other tray, thereby eliminating the need for a time consuming manual step which would normally cause egg breakage.

It is a main feature of the present invention to provide a mechanical egg transfer device which will automatically transfer a large number of eggs (several dozen) from a tray of setter egg flats taken from a climate controlled setter chamber to a hatcher tray intended for deposition in a climate controlled hatcher chamber, without egg breakage and in a minimal amount of time, that is, only the time required to rotate the egg transfer device so that the full hatcher egg tray can be readily removed from the transfer device without fear of egg breakage.

It is yet another feature of the present invention to provide an automatic gripping or clamping means that will secure the tray of setter egg flats to one part of the egg transfer device during egg transfer and for automatically releasing the tray of setter egg flats once the egg transfer is completed and that part of the transfer device is returned to its original position.

It is yet another feature of the invention to include a passive or fixed gripping means which will not only assist the automatic or active gripping means but will guide the transfer of eggs from the one tray to the other so that none of the eggs will tumble or roll unnecessarily into the hatcher tray during transfer.

It is still another feature of the present invention to mechanically facilitate the rotation of the egg transfer device by means of a countereweight system so that a single worker can operate the device with a minimum of physical effort.

According to one embodiment of the invention there is provided an active rotator assembly for receiving a tray of full setter egg flats. A passive rotator assembly, pivoted about the same axis as the active rotator assembly, lies adjacent the active rotator assembly on a common base or support. An automatic clamping device associated with the active rotator assembly is in an unlocked or open position to allow the active rotator to be loaded with a tray of setter egg flats when the assembly is in its rest positon. A hatcher receiver tray in which the eggs from the setter egg flats are to be transferred is guided on top of the setter egg flats by means of a guide member associated with the active rotator assembly. The passive rotator is now rotated separately from its position adjacent the active rotator assembly to a position lying directly over it. The two rotator assemblies are then rotated together as a unit about their common axis 180 degrees to their opposite position on the table support. At the same time the automatic clamping assembly is automatically biased into its locked position, thus firmly gripping the tray of setter egg flats securely into the active rotator assembly as it is being rotated. The automatic clamping assembly stays in its locked position until the active rotator assembly is swung back separately to its original rest position on the table, at which time the clamping assembly is automatically unlocked, and the tray of empty setter egg flats is then removed from the active rotator assembly.

The invention will be better understood as well as further objects and advantages thereof become more apparent from the ensuing detailed description taken in conjunction with the drawings.

DETAILED DESCRIPTION

Figure 1:
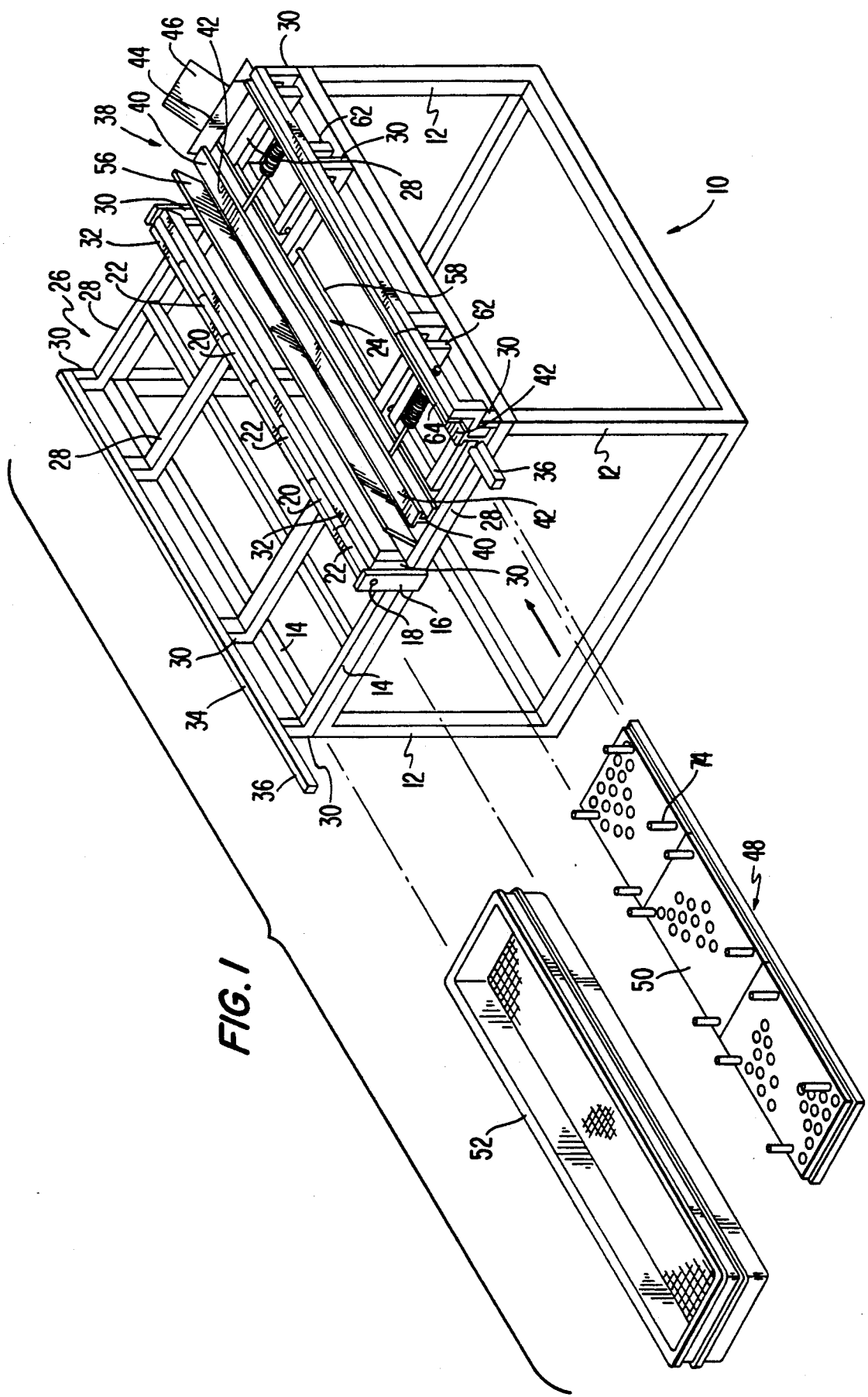
FIG. 1 is a schematic perspective view of the egg transfer device according to the invention.

Referring now to FIG. 1 a base unit 10 is shown, which unit may be provided with roller or castors (not shown) in order to be moved to an appropriate spot near a climate controlled hatcher chamber (not shown) or a climate controlled setter chamber (not shown) and which form no part of the present invention. The base unit or table 10 is shown to be constructed from a generally square configuration of upright leg members 12 which support an upper horizontal bracket assembly composed of horizontal strut members 14. Disposed midway along a pair of opposite strut members 14 is a support bracket member 16 for supporting an axle or shaft member 18 about which pivots by suitable hinge structures 20 and 22 an active rotator assembly 24 and a passive rotator assembly 26.

Each rotator assembly, 24 and 26, is composed of spaced apart horizontal support members 28, the respective ends of which form vertical members 30. The vertical members 30 adjacent the axle member 18 support the respective horizontal members 32 which in turn support the hinge structures 20, 22, so that the hinge structures surround the axle 18, as shown. The distal vertical members 30 respectively support horizontal members 34, each having an extension handle member portion 36. As can be seen from FIG. 1, the active rotator assembly 24 and the passive rotator assembly 26 are structurally the same and reflect the symmetrical opposite of the other.

Also shown in FIG. 1 is a saddle assembly 38 associated with the active rotator assembly 24, which is made up of a pair of opposed vertical strut members 40 for supporting spaced apart horizontal support strips 42, each strip 42 being at right angles to the vertical struts 40, which in turn are secured to the horizontal support members 28. An end stop member 44 joins these spaced apart members 42 at one end thereof. Connected to the end stop member 44 and extending therefrom at an outwardly extending angle is a hatcher tray guide member 46, to be more fully explained below.

Also shown in FIG. 1 is a slide tray 48 containing three setter egg flats 50 and, as well, a hatcher tray 52. As will be explained more fully below, the slide tray 48 for the setter egg flats is designed to slide into the saddle assembly 38 of the active rotator assembly 24, and the hatcher tray 52 (when full) is designed to fit in the passive rotator assembly 26 and be slid out therefrom along the top surface of the spaced apart horizontal support members 28. Also shown adjacent the saddle assembly 38 is a passive sloped clamping member 56, to be more fully explained below with respect to the active clamping assembly.

Figure 2:
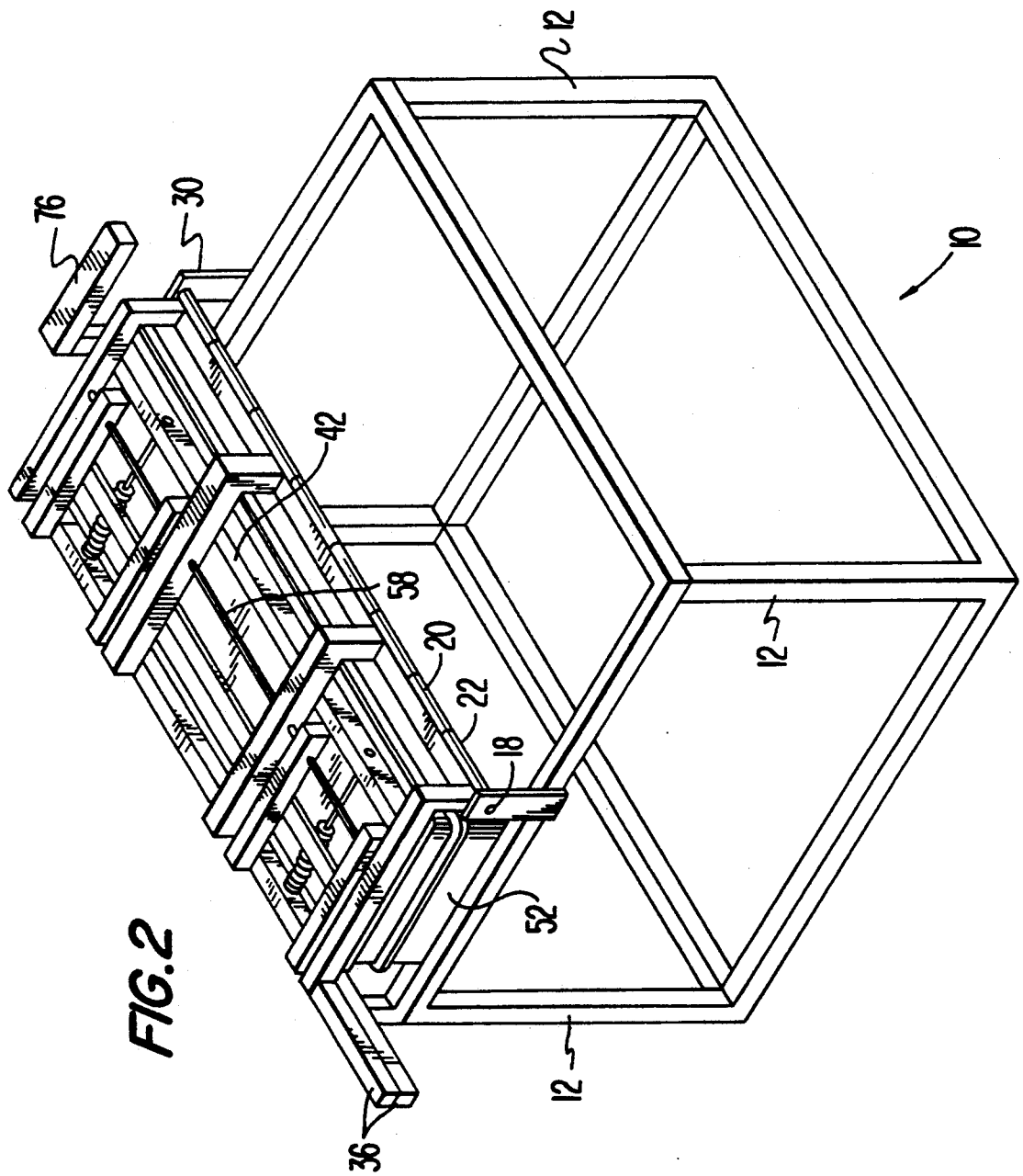
FIG. 2 is a schematic perspective view from the opposite side as shown in FIG. 1 of the egg transfer device, showing in particular the automatic clamping assembly.
Figure 3:
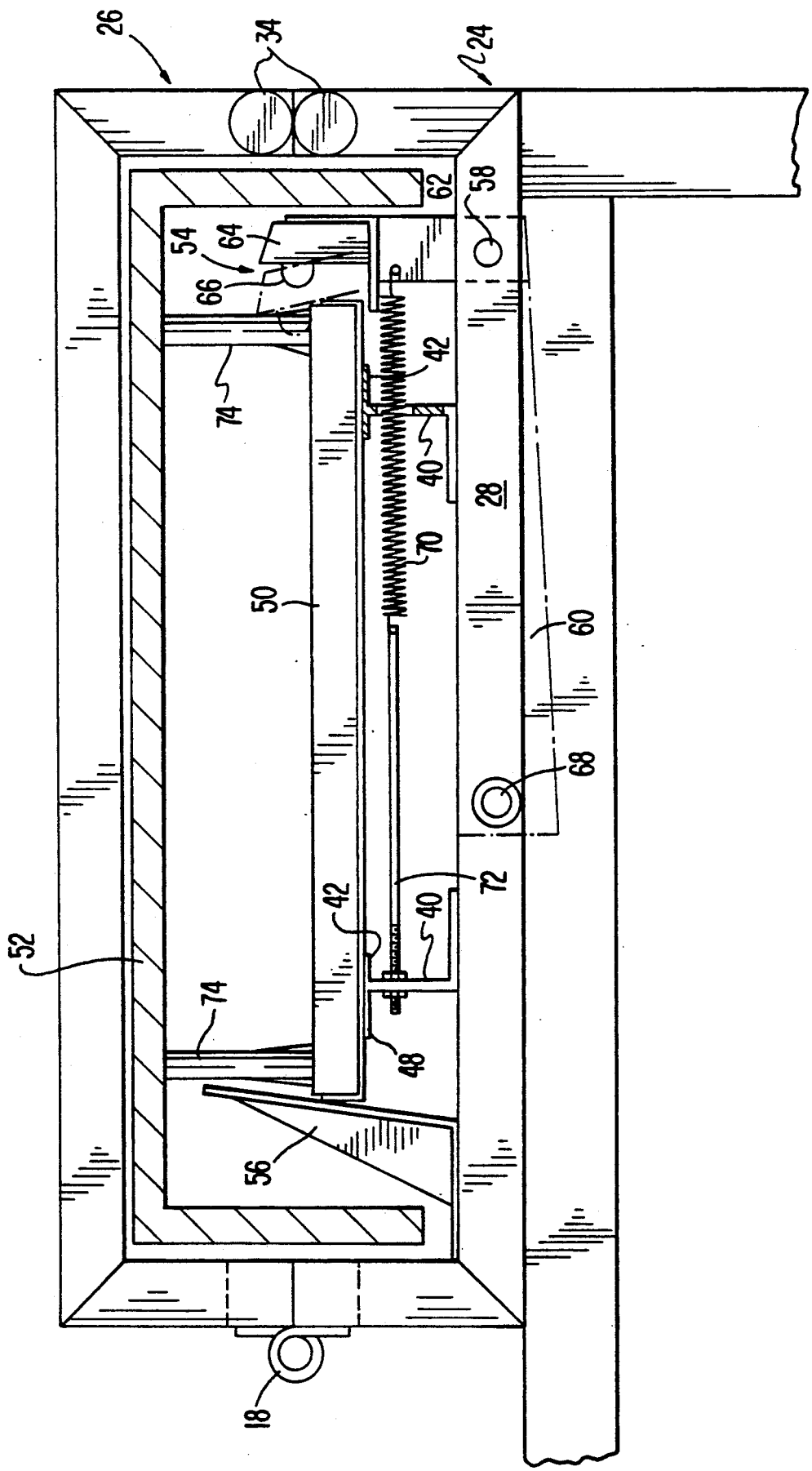
FIG. 3 is a schematic end view of the device, showing the two assemblies, the passive rotator and the active rotator in their superimposed position before their rotation as a unit.

Referring now to FIGS. 2 and 3, there is shown an active clamping assembly 54 associated with the active rotator assembly. Disposed near one end of the active rotator assembly and extending through all of the horizontal support member 28 is a pivot shaft 58 about which are pivoted a pair of identical bracket members 60. The bracket members 60 are rigidly connected to right angle extensions 62 thereof at the point of their pivot about the shaft 58, forming gnerally L-shaped members; the vertical extensions 62 in turn fixedly support a wooden support member 64 extending substantially the length of the rotator assembly. Fixed to the wooden support member 64 is a foam rubber bulb member 66, also extending the same lenqth as the support member. The foam rubber bulb member 66 may be covered by Neoprene or other suitable protective material. The other ends of the pivotal bracket structures 60 are provided with suitable cam roller members 68, rotatably supported on a suitable shaft extending between the leg members 60. It is conceivable, however, that the cam rollers may be replaced by a simple strut member that would have the same camming action (to be explained below) as the rollers. The active clamping assembly is normally biased into its setter egg flat gripping position by means of the coil springs 70 connected at respective first ends thereof to the vertical extension members 62 and at their other respective ends to an adjustable spring tension adjustment rod member 72 which are threaded for this purpose in suitable apertures provided in the vertical support members 40. Thus, the spring members 70 pull on the vertical extension members 62 of the L-shaped bracket members 60, causing the entire automatic clamping mechanism to pivot about the shaft 58 so that the bulb member swings past the plane defining the edge of the setter egg flats that are disposed in the saddle assembly and thereby engage same. Only when the active rotator assembly is resting on the base is the active clamping assembly automatically brought into its non-gripping position, since in this case the base or table acts as a camming surface against the cam roller members 68 against the bias of the spring members 70. The bracket members 60 will then pivot about the shaft 58 causing the bulb member 66 to swing back out of the plane defining the edge of the setter egg flats and into a non-gripping position. It will be seen that the setter egg flats are also provided with vertical extension posts 74 that not only secure the egg flats against their support in the saddle assembly, once the passive rotator is brought into position atop the active rotator, but also provide a surface of resistance against which the gripping action of the bulb member 66 takes place.

Connected at one end of the active rotator assembly is a counterweight extension member 76 that, by swinging in a downward gravity-assisted direction, acts to assist the force required to rotate the two assemblies or just the one active rotator assembly.

The operation of the egg transfer device is as follows. As shown in FIG. 1, a slide tray 48 of three full setter egg flats 50 is slid into the saddle assembly 38 (in the direction of the arrow) and is caused to come to a stop by the end stop member 44. The empty hatcher tray is now placed over the setter egg flats and is guided into place by the guide member 46, so that the bottom of the hatcher tray comes to rest on the upright posts 74 extending from the setter egg flats 50. It is important to note at this time that the automatic or active clamping mechanism 54 is in its non-gripping position and will remain so, as long as the active rotator member is resting on the table 10; this position, of course, allows the slide tray 48 of the setter egg flats to slide into position on the saddle assembly 38 without interference. Now the passive rotator assembly 26 is rotated about the common axle member 18 until it is atop the active rotator assembly 24, such as shown in FIG. 3. The two handle members 36 are gripped by the operator, only one operator being needed, and both assemblies, the active and passive assemblies 24 and 26, are rotated as a single unit about their common axle 18. Once the active rotator assembly 24 leaves the table 10 the automatic clamping mechanism 54 becomes activated by virtue of the spring bias action on the bracket members 60 and, thereby causing the L-shaped members to rotate about the shaft 58, which in turn causes the bulb member 66 to press against the side of the setter egg flats 50 as well as the upright posts 74. At the same time the slide tray 48 bears against the passive or fixed clamp 56 on the opposite side of the setter egg flats.

Also, counterweight extension member 76, by means of its gravity assisted movement in an opposite and downward direction to that of the angular direction in which the rotator assemblies 24, 26 are being rotated, lessens considerably the force required to rotate the assemblies. As the eggs transfer themselves from the setter egg flats 50 to the hatcher tray 52 during the course of the rotary movement of the rotator assemblies, the fixed clamp member 56, by means of its extension into the interior space of the hatcher tray 52, will help guide the eggs into the hatcher tray and will prevent, as well, any eggs from tumbling or rolling in a downward direction to the side wall when it becomes the bottommost surface of the hatcher tray 52 during the egg transfer.

When the rotator assemblies are fully rotated 180 degrees, the active rotator can be returned to its original position without fear of the setter egg flats gripped therein falling out, since the active clamping mechanism 38 remains active or in its locking position so long as the active rotator 24 is away from the level surface of the table 10. Once the active rotator assembly is returned to its horizontal position on the table 10, the active clamping mechanism 54 is cammed into its non-gripping or locking position by reason of the camming rollers coming into contact with the table and thus rotating the L-shaped brackets 60 against the bias of the spring members 70 so that the bulb member 66 comes out of contact with the setter egg flats. The hatcher egg tray, which is now full, can be removed from the passive rotator assembly by simply sliding the tray therefrom, as shown in FIG. 1. Similarly, the slide tray 48 with the empty setter egg flats 50 thereon can also be slid from the active rotator assembly 24, thus readying the egg transfer device for another automatic egg transfer operation.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. An egg transfer device, comprising
   a level base supporting a shaft means parallel to the level of said base
   a first rotator assembly and a second rotator assembly separately rotatable about said shaft, whereby each said assembly has a rest position touching said base,
   a first egg tray movably disposed within said first rotator assembly,
   a second egg tray movably disposed within said second rotator assembly,
   means for rotating said first rotator assembly and said second rotator assembly as a single unit about said shaft to cause eggs in said first egg tray disposed in said first rotator assembly to transfer into second egg tray disposed in said second rotator assembly, and
   clamping means movably disposed on said first rotator assembly and responsive to the movement thereof with respect to said base for automatically engaging said first egg tray in said first rotator assembly when said first rotator assembly is moved from said rest position.

2. An egg transfer device according to claim 1, wherein said clamping means is disengaged from said first egg tray when said first rotator assembly is in said rest position.

3. An egg transfer device according to claim 2, wherein said clamping means is rotatably mounted in said first rotator assembly and further comprises spring means for normally biasing said clamping means into said engaging position.

4. An egg transfer device according to claim 3, wherein an extension member of said clamping means extends beyond the perimeter of said first rotator assembly when biased into said engaging position and said extension member is acted upon by said base when said first rotator assembly is in said rest position to move said clamping means against the bias of said spring means into said disengaging position.

5. An egg transfer device according to claim 1, further comprising a counterweight means disposed on said first rotator assembly to thereby assist the manual force required to rotate said first rotator assembly.

6. An egg transfer device according to claim 1, further comprising a fixed clamping member disposed in said first rotator assembly and separate from said movable clamping means for engaging a portion of said first egg tray not engaged by said movable clamping means.

7. An egg transfer device according to claim 6, wherein said movable clamping means and said fixed clamping means are disposed on opposite sides of said first egg tray, said fixed clamping means also extending into the interior of said second egg tray for guiding the eggs from said first egg tray into the free space in said second egg tray during said egg transfer.

8. An egg transfer device according to claim 1, further comprising a guide means disposed on said first rotator assembly for guiding said second egg tray to a position overlying said first egg tray.

9. An egg transfer device, comprising
   a level base supporting a shaft means parallel to the level of said base
   a first rotator assembly and a second rotator assembly separately rotatable about said shaft, whereby each said assembly has a rest position touching said base,
   an egg tray movably disposed within said first rotator assembly,
   means for rotating said first rotator assembly and said second rotator assembly as a single unit about said shaft to cause eggs in said egg tray disposed in said first rotator assembly to transfer into said second rotator assembly, and
   clamping means movably disposed on said first rotator assembly and responsive to the movement thereof with respect to said base for automatically engaging said egg tray in said first rotator assembly when said first rotator assembly is moved from said rest position.

10. An egg transfer device, comprising
    a level base supporting a shaft means parallel to the level of said base a first rotator assembly and a second rotator assembly separately rotatable about said shaft, whereby each said assembly has a rest position touching said base, a first egg tray movably disposed within said first rotator assembly, a second egg tray movably disposed within said second rotator assembly, means for rotating said first rotator assembly and said second rotator assembly as a single unit about said shaft to cause eggs in said first egg tray disposed in said first rotator assembly to transfer into said second egg tray disposed in said second rotator assembly, clamping means movably disposed on said first rotator assembly and responsive to the movement thereof with respect to said base for automatically engaging said first egg tray in said first rotator assembly when said first rotator assembly is moved from said rest position, and fixed clamping means disposed in said first rotator assembly for engaging a portion of said first egg tray not engaged by said movable clamping means, said fixed clamping means also extending into the interior of said second egg tray for guiding the eggs from said first egg tray into the free space in said second egg tray during said egg transfer.

* * * * *